United States Patent [19]
Avot

[11] Patent Number: 4,721,317
[45] Date of Patent: Jan. 26, 1988

[54] TROLLEY WITH REMOVABLE CONTAINERS FOR THE USE OF CUSTOMERS IN SUPERMARKETS

[75] Inventor: Jean P. Avot, Les Loges en Josas, France

[73] Assignee: Societe Anonyme dite: Livratel, Versailles, France

[21] Appl. No.: 847,637

[22] Filed: Apr. 3, 1986

[30] Foreign Application Priority Data

Apr. 12, 1985 [FR] France .................................. 85 05545
Jun. 27, 1985 [FR] France .................................. 85 09784

[51] Int. Cl.$^4$ ................................................. B62B 1/12
[52] U.S. Cl. .............................. 280/33.99 F; 248/98; 248/101; 248/129; 280/47.35
[58] Field of Search ................. 248/97, 98, 99, 100, 248/101, 129; 280/33.99 R, 47.35, 33.99 F; 224/42.46 R

[56] References Cited

U.S. PATENT DOCUMENTS

| | | | |
|---|---|---|---|
| 2,762,669 | 9/1956 | Watson | 280/33.99 R |
| 2,896,960 | 7/1959 | Whiting, Jr. | 248/98 X |
| 3,497,234 | 2/1970 | Schray | 280/47.35 X |
| 3,893,649 | 7/1975 | Cornell et al. | 248/99 |
| 4,316,644 | 2/1982 | Johnson | 248/99 X |
| 4,448,434 | 5/1984 | Anderson | 248/98 X |

FOREIGN PATENT DOCUMENTS

| | | |
|---|---|---|
| 1124275 | 5/1982 | Canada . |
| 2557976 | 6/1977 | Fed. Rep. of Germany . |
| 1163199 | 9/1958 | France . |
| 2539288 | 7/1984 | France . |
| 6904282 | 9/1970 | Netherlands . |
| WO84/00940 | 3/1984 | PCT Int'l Appl. . |
| 2089294 | 6/1982 | United Kingdom . |
| 2116490 | 3/1983 | United Kingdom . |

Primary Examiner—John J. Love
Assistant Examiner—Michael Mar
Attorney, Agent, or Firm—Scully, Scott, Murphy & Presser

[57] ABSTRACT

The invention relates to a trolley for use by customers in supermarkets, of the type comprising a base mounted on orientable wheels, two vertical uprights and cross pieces joining the uprights together at their lower part and at their upper part.

At the upper part of the uprights are fixed, horizontally and perpendicularly to the plane formed by the uprights, at least two tubular sleeves having a longitudinal slit which extends over the whole length of their lower generatrix, the sleeves serving for hooking parallelepipedic bags comprising at their upper part two pairs of hooking straps formed by flexible strips fixed by one of their ends to the upper edge of the longitudinal walls of the bag ad which are wound about rigid rods, each rod being slid over at least a portion of its length inside a sleeve, the straps passing through the slit in the sleeve.

13 Claims, 7 Drawing Figures

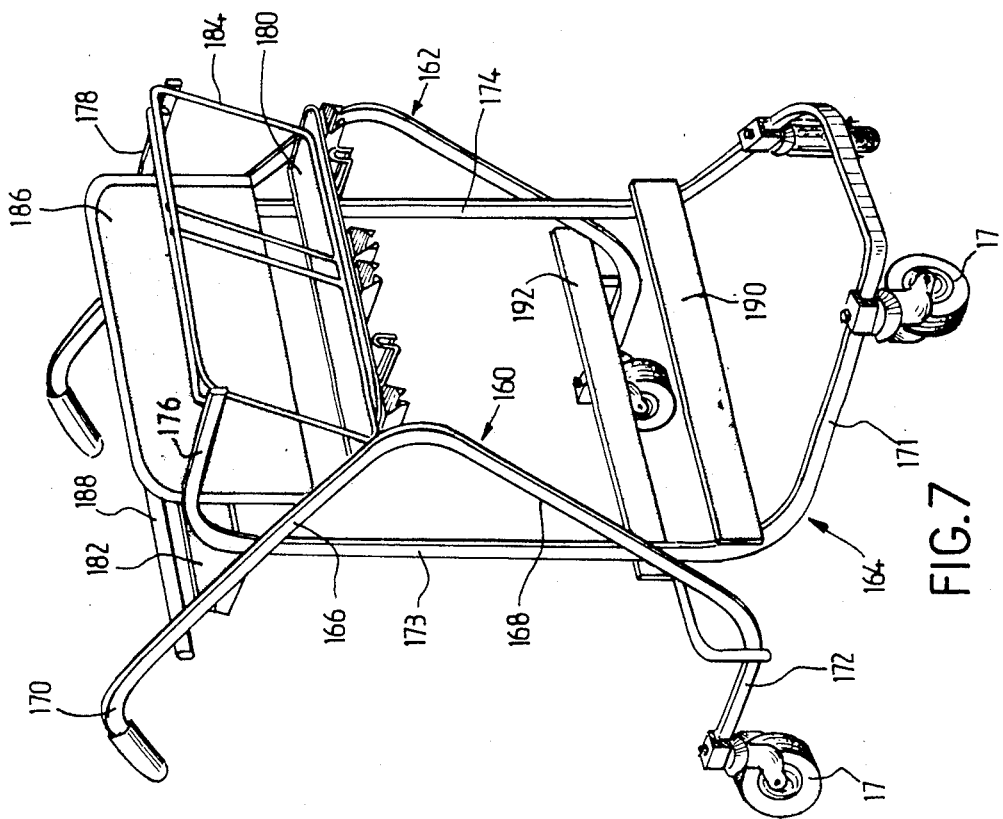
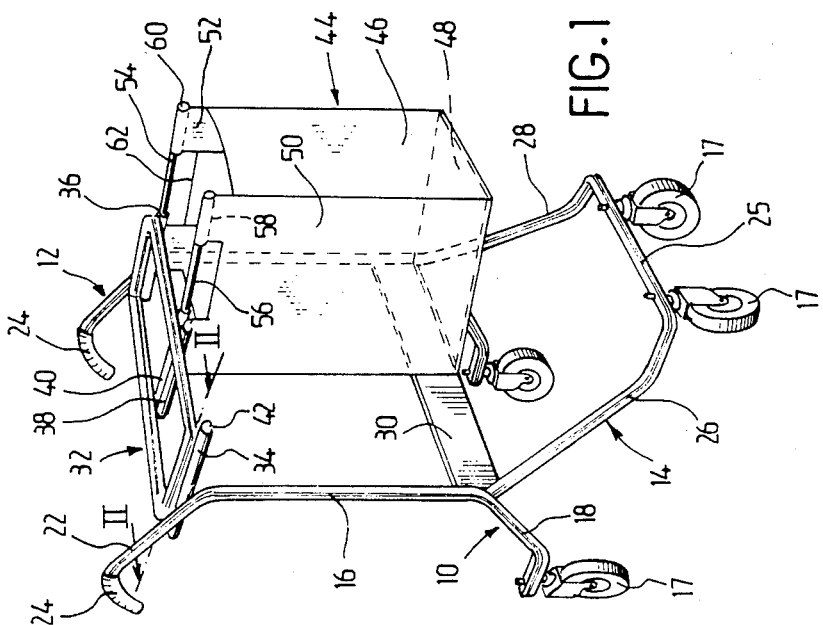
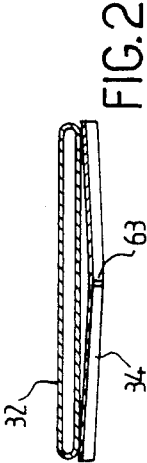

TROLLEY WITH REMOVABLE CONTAINERS FOR THE USE OF CUSTOMERS IN SUPERMARKETS

BACKGROUND OF THE INVENTION

1. Field of the Invention

The present invention relates to a handling trolley for transporting goods and more particularly a trolley of the type generally used in self service supermarkets.

It is known that trolleys of this type generally comprise a metal basket of latticed structure which is fixed firmly to a base mounted on wheels, said basket being provided with a transverse handle for moving the trolley.

These trollies are generally heavy and expensive because of the amount of metal used for manufacturing the basket. Furthermore, because the basket is inseparable from its base and is in any case the inalienable property of the supermarket, it is necessary to transfer the goods either into bags distributed or bought, or directly into the trunk of the customer's car. In both cases, such transfer forms a time wasting operation often detrimental to the goods. Moreover, the supply of free bags to the customers necessarily increases the cost of the goods.

This is why, in the past a certain number of types of trollies have already been proposed which overcome these drawbacks because they comprise means for hooking on removable baskets or bags, which may then be separated from the trolley and taken away by the customer.

2. Description of the Prior Art

Thus from the patent FR No. 1 163 199 a trolley is known comprising a platform mounted on wheels, two lateral slanting uprights and having a series of superimposed hooks able to receive stepped baskets. All the elements of this trolley are made from metal tubes welded together, which confer on the trolley an unesthetic and solid appearance. Moreover, because of the amount of material used, such a trolley is heavy and of a high cost price.

The patent PCT No. 84 00940 relates to a handling trolley which comprises, above a wheeled base, a container having means for hooking the handles of removable bags. The container is not removable, so that the trolley even empty is heavy and relatively space consuming.

From the patent DE No. 2 557 976, a trolley is known of the pushchair type comprising two rectangular frames hinged together substantially at the middle of their slanting uprights and which comprise on these uprights hooks for hanging a bag. This latter has a parallelepipedic shape and comprises, at the upper edge of each of its two longitudinal sides, two straps welded by their ends to the wall of the bag so as to form tubular passages. Two gripping rods are introduced through said passages and their bare portions between the straps serve for gripping by the hands of the user. Such a trolley is much less heavy and space consuming than the preceding ones, but it is relatively fragile and can therefore transport only one bag of small weight. In addition, such a trolley cannot be placed at the disposal of the customers in supermarkets, but it is more suitable to be the personal property of each customer.

The patents GB No. 2 116 940 and CN No. 1 124 275 each relate to a trolley having a fixed metal basket in which may be placed one or more removable baskets, but because the fixed basket cannot be removed, these trollies are relatively heavy and cumbersome.

SUMMARY OF THE INVENTION

The present invention provides a handling trolley free of all the drawbacks of the trollies of the prior art cited, namely a trolley which is robust although light, taking up little room and which may transport one or more removable bags.

To this end, the trolley of the invention is of the type comprising a base mounted on orientable wheels, two vertical uprights and cross pieces connecting said uprights together at their lower part and at their upper part, said trolley further comprising at least two tubular sleeves fixed at the upper part of the uprights or on the upper cross piece, in a substantially horizontal position perpendicular to the plane formed by the uprights, said sleeve having a longitudinal slit which extends along the whole of their generatrix, and wherein said sleeves serve for hanging parallelepipedic bags comprising at their upper parts two pairs of hanging straps formed by flexible strips fixed by one of their ends to the upper edge of the longitudinal walls of the bag and which are bent back and fixed on themselves at their other end, so that in the passages formed by the two strap relative to each longitudinal side of the bag, two rigid rods may be introduced, each rod being slid over at least a portion of its length inside the sleeves, and the straps passing through the slit of the sleeves.

For hanging such a bag on the trolley, the two rods of the bag are slid into two adjacent sleeves, the longitudinal slit of these latter allowing the free passage of the straps.

Advantageously, the sleeves have a length double the width of each strap and comprise in the middle of their length an internal stop intended to limit the penetration of the rod. The result is that two bags may be hung on two adjacent sleeves, one at each of the ends of said sleeves. The bags are thus hung in cantilever fashion since only the portion of each rod which is covered by a strap is engaged in the corresponding sleeve, the rest of the length of the rods not being supported.

The lower cross piece of the trolley is advantageously formed as a vertical flat plate, against which the bottom of the bag which itself comprises a rigid plate comes into abutment. The cooperation of the bottom plate of the bag and said lower cross piece, under the action of the weight of the bag, prevents the cantilever rod portions from assuming too much flexion.

In a variant of the invention, the straps of the bag are held tightly about the rods by means of resilient tubular sheaths, split longitudinally and having an internal diameter slightly less than that of the rods and an external diameter less than the inner diameters of the sleeves, the ends of the sleeves being opened out so as to facilitate the introduction of the rods and having two tongues obtained by bending inwardly and upwardly the end edges of the sleeves situated on each side of the slit, as far as a level where they form stops for the sheaths in the case of accidental withdrawal of the bag.

BRIEF DESCRIPTION OF THE FIGURES

The invention will now be described in detail with reference to the accompanying drawings in which:

FIG. 1 is a perspective view of a trolley in a first embodiment for hooking on bags with straps and rods;

FIG. 2 shows a variant of construction with hooking sleeves, corresponding to a sectional view through line II—II of FIG. 1;

FIG. 7 is a perspective view of a trolley in a fourth embodiment.

DESCRIPTION OF THE PREFERRED EMBODIMENTS

Figure 3:
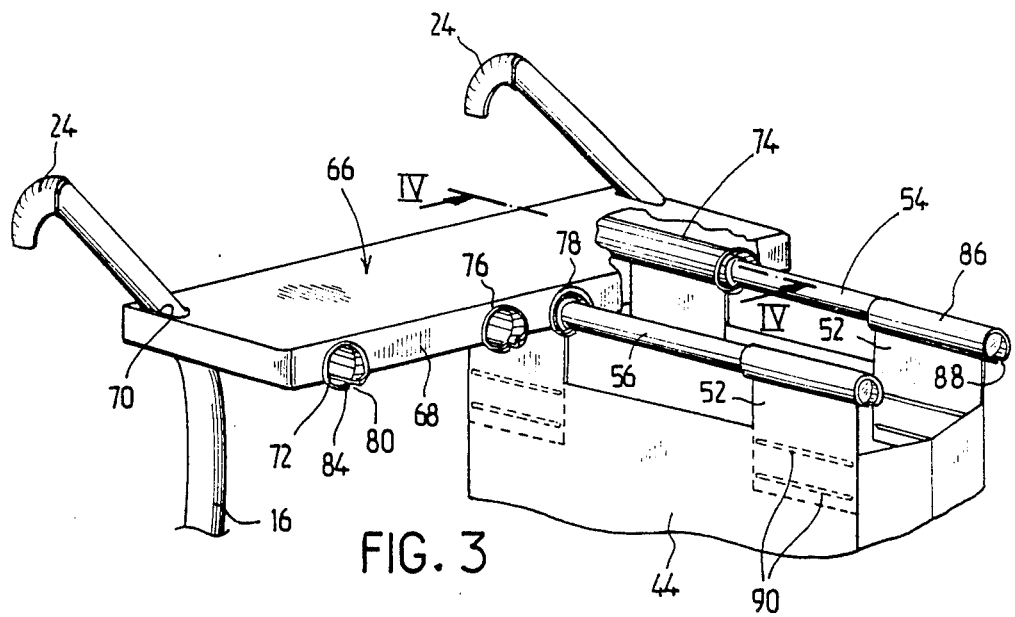
FIG. 3 is a partial perspective view of another embodiment of the system for hooking on a bag with straps and rods.

The trolley shown in FIG. 1 comprises a support structure formed of three tubular elements 10, 12, 14 welded together. The first two elements 10, 12 are identical and are disposed in two vertical substantially parallel planes They have substantially a U shape and each comprise a vertical arm or upright 16, a lower downwardly slanted arm 18 extended by a horizontal portion to which is fixed a pivoting wheel 17, and an upwardly slanted upper arm 21 ending in a handle 23 for manoeuvering and guiding the trolley. Arms 18 and 21 are bent rearwardly of the trolley, that is to say on the side where the customer is positioned when he is conducting the trolley.

The third tubular element 14 also has a U shape comprising a horizontal central arm 25 with two pivoting wheels 17 and two side arms 26, 28 bent rearwardly and centered slightly upwardly. The ends of arms 26, 28 are fixed by rivetting, welding or similar, respectively to the tubular elements 10, 12 substantially at the level of the lower end of upright 16.

The tubular elements 10, 12 are disposed in two vertical parallel planes and are joined together on the one hand by a lower cross piece 30 formed by a vertical flat plate and which is fixed by rivetting or welding to the lower ends of the uprights and, on the other hand, by an upper cross piece which, in the present case, is formed by a rectangular frame 32 of tubular structure, which is disposed horizontally and is welded by the middle of its small sides to the upright. This frame may be used for carrying bulky or weighty products.

On the two small sides of the frame are fixed two cylindrical lateral sleeves 34, 36 which are therefore parallel to the longitudinal axis of the trolley. Two other sleeves 38, 40 parallel to the first two are mounted under the frame and are welded by their ends to the middle of the large sides thereof. These four sleeves each have a longitudinal slit 42 extending along the whole of its lower generatrix.

On this trolley may be hung parallelpipedic bags 44 whose transverse walls 46 have a width substantially equal to the distance between a lateral sleeve 34 or 36 and the adjacent central sleeve 38 or 40. The bottom of the bag is held flat by means of the rigid plate 48. The bag is provided on the upper edge of each of its two longitudinal walls 50 with two straps 52. These may be formed either by separate strips of plastic material which is welded to the bag or, preferably, cut out in a single piece with the longitudinal walls 50. The straps associated with each longitudinal wall are wound about the ends of a gripping rod 54, 56 and are folded back to the inside of the bag and are fixed by welding or bonding. To prevent the rods from sliding out of the straps these latter are tightened about the rods by longitudinal weld lines 58 between the two walls of the straps, and by means of end weld lines 60 which close the straps beyond the ends of the rods.

Once the rods are positioned in the straps, these latter define on each longitudinal wall an indentation 62 through which a person may pass his hand for gripping the central portion of the rod which is not covered by the straps. Each strap has a width substantially equal to a third of the length of the strap.

For hooking a bag on a trolley, the two rods 54, 56 are slid into two adjacent sleeves 34, 38 or 36, 40. In this movement, the straps pass freely through the slits 42.

In the variant shown in FIG. 2, the sleeves have a length substantially twice the width of the straps and have in their middle an internal stop 63 for limiting the introduction of the rods to a length corresponding to the width of the straps, i.e. about a third of the total length of the rods. The result is that the bags may be fitted indifferently by one or other of the ends of the sleeves, and four bags may be hung on the trolley. The bags are hung in cantilever fashion since about two thirds of the rods are free. So that the rods do not bend too much under the weight of the bag, they are made from a hard inflexible material. Moreover, the bag will be given a height such that in the suspended position its bottom 48 comes into abutment against the lower cross piece 30. Finally, during manufacture, sleeves 34 to 40 will be given a shape slightly bent in the middle (see FIG. 2), so that their free ends are at a level slightly higher than that of the central portion. The bags are thus in a stable position since the rods tend to slide against stops and therefore do not risk becoming unhooked under the action of jerks or shocks.

For unhooking a bag, the two bare portions of the rods are gripped by passing the hands through the indentations 62 and the rods are pulled out so as to release them from the sleeves.

Such a trolley comprises only a very few parts. It is therefore light and inexpensive, in addition, its line reduced to the essentials is esthetic, the slightly resilient suspension of the bags and the facility of guiding make it a very attractive article for the user.

In the variant of construction shown in FIG. 3, the frame of FIG. 1 is replaced by a rectangular table 66 which comprises a downwardly turned peripheral flange 68. The table has, in the vicinity of its small sides, two cut-outs 70 through which the handles 23 of uprights 16 may be passed during manufacture. The uprights are welded or rivetted to the flange 68 of the small sides. Under the table are fixed four horizontal sleeves, parallel to the longitudinal axis of the trolley, two sleeves 72, 74 being situated in the vicinity of the small sides of the table, the other two 76, 78 being near the middle thereof.

Figure 4:
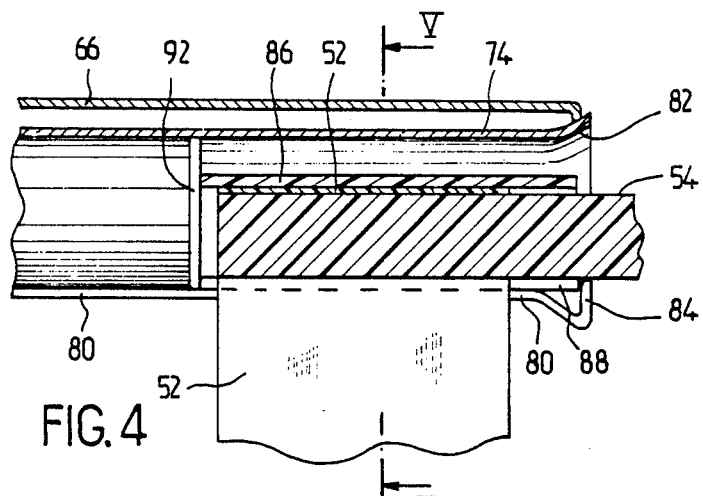
FIG. 4 is a sectional view through line IV—IV of FIG. 3.

The sleeves in this construction also have a longitudinal slit 80 which extends along the whole of their lower generatrix but, as can be seen more clearly in FIG. 4, they differ from the sleeves of FIG. 1 because they end at both ends in widened portions 82 and because the ends situated on each side of the slit are raised inwardly of the sleeves so as to form tongues or stops 84.

Figure 5:
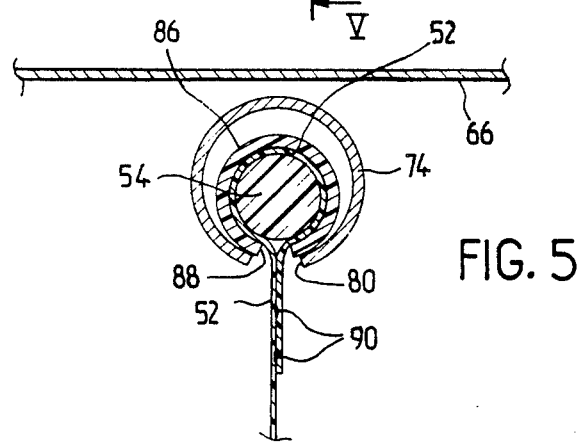
FIG. 5 is a sectional view through line V—V of FIG. 4.

As can be seen in FIGS. 3 to 5, straps 52 of bag 44 are tightened on the rods 54, 56 by means of tubular sheaths 86 which have a longitudinal slit 88 over the whole of their length. These sheaths are made from a rigid material having a certain resilience and have an internal diameter slightly less than the diameter of the rods and an external diameter substantially less than the internal diameter of the sleeves. The sheaths thus grip round the straps on the rods and the edges of their slit nip the two walls of the straps at the base of the rods. Thus it is not necessary to weld the straps at the base of the rods and at the ends thereof, as was the case in the embodiment shown in FIG. 1. Only two weld lines 90 are required for connecting the end of the straps to the wall of the bag.

As shown in FIG. 4, the tongues 84 project inside the sleeves over a height substantially equal to the thickness of sheaths 86.

Thus, for hanging on a bag, the two rods 54, 56 are introduced into two adjacent sleeves. This introduction takes place rapidly and without trial and error since the sleeves are widened out at their ends. The rods are pushed in over the whole width of a sheath, the permitted travel being limited by stops 92 provided inside the sleeves, half way therealong. Once the bag has thus been hooked on, the external ends of the sheaths are in line with tongues 84 which, as has already been mentioned, project in the sleeves over a height equal to the thickness of the sheaths. Said tongues therefore lock the sheaths against any accidental removal forwards out of the sleeves. On the other hand, when it is desired to unhook the bag, rods 54, 56 are raised slightly so as to release the sleeves 86 out of the range of the tongues which is possible because of the relatively large diameter of the sleeves, and then the rods may be entirely removed from the sleeves.

Figure 6:
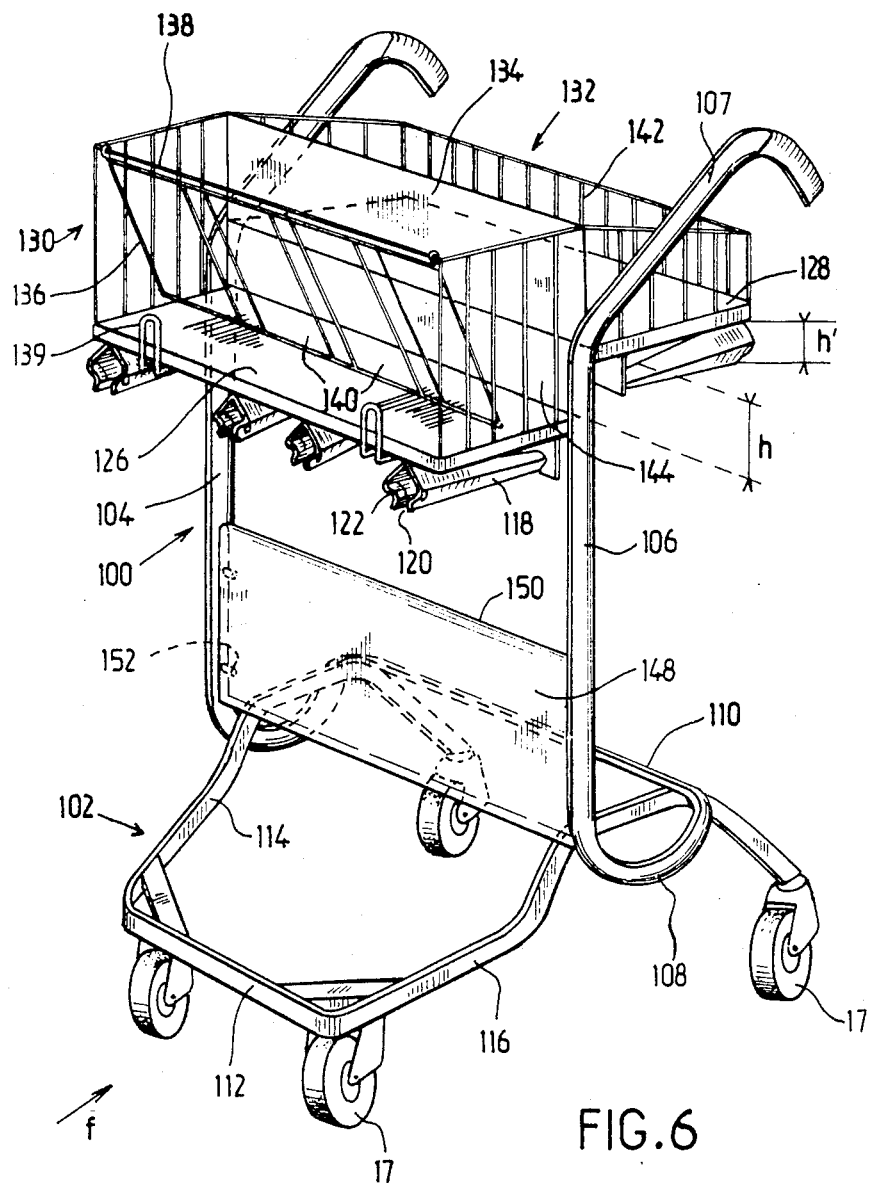
FIG. 6 is a perspective view of a trolley in a third embodiment.

The trolley shown in FIG. 6 is distinguished from that of FIG. 1 by the fact that its uprights and its base are formed of two tubular elements only 100 and 102, substantially in the form of a U, which are suitably shaped and welded together. The first element 100 comprises two vertical arms 104, 106 forming the uprights and which end at their upper end in rearwardly bent handles 107 for guiding the trolley. The uprights are extended at their lower end by upwardly curved semi-circular portions 108 which are connected together by a horizontal cross arm 110. The second tubular element 102 extends in a substantially horizontal plane at the lower part of the trolley. It comprises a horizontal cross arm 112 and two side arms 114, 116. At the corners of said horizontal arm and at the ends of the side arms are fixed orientable wheels 17. The cross arm 112 is at a lower level with respect to that of arm 110 of element 100. The side arms 114, 116 are first of all horizontal, then rise upwardly as far as the level of arm 110 and then go down again. Elements 100, 102 are welded together are four points.

Another difference resides in the shape of sleeves 118. These latter have the shape of a truncated pyramid in FIG. 6, but they may also have the shape of a truncated cone. They also comprise a longitudinal slit 120. At their widest opening, the sleeves comprise, on each side of the slit, two stampings 122 which project inwardly and which have the same function as tongues 84 in FIG. 4.

The bags which may be used with such a trolley are the same as that 44 shown in FIG. 3. The section of the sleeves 118 at their narrow end is slightly less than that of the sheaths 86. The result is that when a rod 56 is fitted in a sleeve 118, its end is jammed in the narrow section thereof thus the rods cannot rise inside the sleeves, under the weight of the bag.

The sleeves are fixed into the bottoms 126, 128 of baskets 130, 132 which are disposed on each side of the plane formed by uprights 104, 106. Said bottoms are formed by flat rectangular shelves which are inserted exactly between the uprights. Basket 130 is parallelepipedic in shape and its side walls are formed with rigid wires, but they may also be solid. For a clearer understanding of the drawing, the rear wall 134 of basket 130 has been shown in the form of a solid plate. It is situated substantially in the plane formed by the uprights.

Basket 130 is fixed to these latter by any appropriate means, for example by welding. The front wall 136 of this basket is mounted for pivoting along the whole of its upper large side, about a transverse shaft 138 forming the upper edge of the basket. In the rest position, the front wall hangs downwardly thus forming the front side of the basket. Stops 139 are provided for preventing said wall from pivoting beyond its vertical position outwardly of the basket.

This basket may serve for sitting two babies therein For this, the front wall 136 is formed of vertical rods which form therebetween four openings 140 through which the legs of the babies may be passed, the rear wall 134 then serving as seat back.

The other basket 130 serves for transferring weighty or bulky products which cannot be placed in the bags. It has the form of a truncated pyramid whose large base is formed by the rear wall 134 and whose small base is formed by the opposite rear wall 142. The horizontal bottom 128 of this basket is flat and its small sides converge slightly from the back plate towards wall 142. Similarly, the height of the basket decreases progressively from the rear wall to wall 142.

The bottom 128 of basket 132 is at a higher level with respect to the bottom 126 of basket 130, the difference of level h being at least equal to the height h' of sleeves 118 in line with their widest opening. Bottoms 126 and 128 are joined together by a front plate 144.

The result of such dimensioning is that the trollies may be stacked together one behind the other. If in fact a trolley, not shown, is brought in the direction of arrow f in FIG. 6, its basket 128 which, as has already been mentioned has the form of a truncated pyramid, fits inside the baby carrier basket 130 of the trolley shown in FIG. 6, without the walls or the bottom of this basket opposing such stacking. Basket 132 and the sleeves which are fixed thereunder are then housed exactly in the basket 130 of the other trolley. During stacking, the basket 132 causes the front wall 136 to pivot about the axis 138 so as to bring it into substantially horizontal position. The permitted stacking travel is defined by the abutment of the rear wall 142 of basket 132 against the front plate 144. It will be noted that the open U shape of base 102 also allows stacking of the trollies.

The lower cross piece 148 of the trolley is removable in this embodiment. It may for example be formed by a metal plate bent about a bend line 150, this plate being fixed by sliding over fixing means 152 carried by the uprights. Besides its function already mentioned as stop for the bags, this cross piece may receive advertising announcement on its two faces. This is why it has a height greater than that of cross piece 30 of the trolley of FIG. 1.

Referring now to FIG. 7, the trolley in this embodiment comprises, as in that of FIG. 1, a support structure formed of three tubular elements 160, 162, 164 substantially in the form of a U, welded together. Elements 160, 162 are identical and are disposed in two parallel vertical planes They each comprise two arms 166, 168 bent in a V shape ending respectively in a handle 170 and a rearwardly bent horizontal portion 172 comprising an orientable wheel 17. The third element 164 comprises a lower U shaped portion 170 situated in a horizontal plane and carrying two orientable wheels 17. The arms of said U shaped portion are bent and are extended upwardly by uprights 173, 174 bent forwardly at their upper end so as to form horizontal portions 176, 178. Uprights 173, 174 are welded at their intersection point with the V shaped arms 166, 168. On the arms 166 of the two elements 160, 162 are welded, on each side of the uprights 173, 174, two substantially horizontal trays 180, 182 preferably slanted slightly downwards and towards each other. Tray 180 situated in front of the uprights serves as a seat for a baby, whereas that which is behind the uprights serves for carrying bulky products which cannot be placed in the bags.

The position of the baby is limited laterally by the above mentioned horizontal portions 176, 178, on the front by a simple metal rod frame 184 which hangs downwards and which is mounted for pivoting on said horizontal portions, and at the rear by a back plate 186.

As in the embodiment shown in FIG. 6, sleeves 170 are fixed under the shelves 180, 182 for hooking on one to four bags.

Arms 166 are cross braced by a cross piece 188 serving as a support for the products which are laid on tray 182. Similarly, uprights 173, 174 on the one hand and arms 168 on the other are cross braced by cross pieces 190, 192 against which the bottom 48 of the bags are engaged, as explained with reference to FIG. 1.

What is claimed is:

1. A trolley for the use of customers in supermarkets, of the type comprising a base mounted on orientable wheels, two vertical uprights and cross pieces joining said uprights together at their lower part and at their upper part, said trolley further comprising at least two tubular sleeves fixed to the upper part of the uprights or to the upper cross piece, in a substantially horizontal position perpindicular to the plane formed by the uprights, each of said sleeves having a longitudinal slit which extends along the bottom of the sleeve, and said sleeves serve for holding parallelepipedic bags comprising at their upper part two hooking straps formed by flexible strips fixed by one of their ends to the upper edge of the sidewalls of the bag, and which are bent back and fixed on themselves at their other end, so that in the passages formed by the two straps relative to each longitudinal side of the bag two rigid rods may be introduced, each rod being slid, over a portion of its length, inside one of the sleeves, and the straps passing through the slits in the sleeves, wherein the straps of the bag are held tight about the rods by means of resilient tubular sheaths, split longitudinally and having an internal diameter slightly less than of the rods and an external diameter less than the internal diameter of the sleeves, the ends of the sleeves being flared out so a to facilitate introduction of the rods.

2. The trolley as claimed in claim 1, wherein each sleeve has a length double the width of a strap, and comprises in the middle of its length, an internal stop, so that a rod may be introduced through each end of the sleeve, the two rods relative to the same sleeve coming into abutment against said internal stop.

3. The trolley as claimed in claim 2, wherein the two sleeves portions situated on each side of the internal stop are slightly slanted with respect to the horizontal and downwards, from their free end as far as the middle portion containing the internal stop, so that the rods received in said sleeve portions tend to slide in abutment against the internal stop.

4. The trolley as claimed in claim 1, wherein each sleeve has two tongues obtained by bending inwardly and upwardly the end edges of the sleeves situated on each side of the slit, to a level where said tongues form stops for the sheath for preventing accidental withdrawal of the bag.

5. The trolley as claimed in claim 4, wherein the sleeves have the shape of a truncated cone or truncated pyramid, whose wide and narrow openings have sections respectively larger and smaller than the section of the rods of the bags, the wide opening having inwardly turned stampings which form a stop for the sheaths.

6. The trolley as claimed in claim 5, wherein each sleeve is slightly slanted with respect to the horizontal and downwards, from its largest section end to its smallest section end, so that the rod tends to be jammed in said small section end.

7. The trolley as claimed in claim 1, wherein the lower cross piece is formed as a vertical plate situated substantially at the same level as the bottom of the bag when the bag is in a position suspended from the sleeves, so as to serve as lateral stop for said bottom.

8. The trolley as claimed in claim 7, wherein the bottom of the bag is made rigid by a rigid plate.

9. The trolley as claimed in claim 1, further comprising two tubular elements suitably bent in the form of a U and welded together, the first element comprising the uprights and the handles, whereas the second element forms the base for the trolley and comprises four orientable wheels.

10. The trolley as claimed in claim 9, comprising a baby-carrying basket and a packet-carrying basket fixed between the uprights at the upper part thereof and on each side of the plane formed by the uprights, the baby-carrying basket being parallelepipedic in shape with a flat bottom and having a front wall mounted for pivoting between a vertical suspended position and an inwardly raised position and in which openings are formed for passing the legs of the baby, the packet-carrying basket having the form of a truncated pyramid tapering rearwardly of the trolley, and said sleeves are fixed under the bottoms of said baskets, the bottom of the packet-carrying basket being at a higher level with respect to that of the bottom of the baby-carrying basket, the difference of level being at least equal to the height of the sleeves in line with their wide opening, so that the packet-carrying basket of a trolley may fit into the baby-carrying basket of another trolley.

11. The trolley as claimed in claim 1, comprising two identical tubular elements curved in the shape of a V, whose arms end at their ends in a handle and a horizontal portion comprising an orientable wheel, and a third tubular element substantially in the shape of a U whose arms form said vertical uprights, said uprights being joined at their lower end by a tubular U shaped portion situated in a horizontal plane, the first two tubular elements being disposed in two vertical parallel planes and being welded by their arms to the uprights, two horizontal trays being welded, at different levels, to the uprights and to the upper arms of the V shaped elements for serving respectively as baby carrier and carrier for bulky products.

12. A trolley for the use of customers in supermarkets, of the type comprising a base mounted on orientable wheels, two identical tubular elements, substantially in the shape of a U, having a vertical arm forming an upright of the trolley, a lower downwardly and rearwardly bent arm comprising a horizontal portion on which is fixed a pivoting wheel, and an upper upwardly and rearwardly slanting arm ending in a handle for handling and guiding the trolley and a third tubular element in the shape of a U, whose arms are fixed by their ends by rivetting, welding or other, respectively to the tubular elements, substantially at the level of the lower end of the uprights, the first two tubular elements being disposed in two parallel vertical planes and being joined together by a lower cross piece formed by a flat vertical plate which is fixed by rivetting or welding to the lower ends of the uprights and being further joined together by an upper cross piece formed by a horizontal rectangular frame welded by the middles of its small sides to the uprights, said trolley further comprising at least two tubular sleeves fixed to the upper part of the uprights or to the upper cross pieces, in a substantially horizontal position perpendicular to the plane formed by the uprights, each of said sleeves having a longitudinal slit which extends along the bottom of the sleeve, and said sleeves serve for holding parallelepipedic bags comprising at their upper part two hooking straps formed by flexible strips fixed by one of their ends to the upper edge of the side walls of the bag, and which are bent back and fixed on themselves at their other end, so that in the passages formed by the two straps relative to each longitudinal side of the bag two rigid rods may be introduced, each rod being slid, over a portion of its length, inside one of the sleeves, and the straps passing through the slits in the sleeves.

13. The trolley as claimed in claim 12, wherein said first two tubular elements are joined together at the upper part of the uprights by a rectangular and horizontal tray comprising a downwardly turned peripheral flange, the tray having in the vicinity of its small sides two cut-outs through which the handles of the uprights may be passed during manufacture, and said sleeves are fixed under said tray.

* * * * *